United States Patent
Bader et al.

[11] Patent Number: 6,112,249
[45] Date of Patent: Aug. 29, 2000

[54] NON-DISRUPTIVELY REROUTING NETWORK COMMUNICATIONS FROM A SECONDARY NETWORK PATH TO A PRIMARY PATH

[75] Inventors: Lance D. Bader, Cary; John O. Mitchell, Raleigh, both of N.C.

[73] Assignee: International Business Machines Corporation, Armonk, N.Y.

[21] Appl. No.: 08/866,555

[22] Filed: May 30, 1997

[51] Int. Cl.[7] .................................................... G06F 11/00
[52] U.S. Cl. ........................ 709/239; 709/237; 709/238; 709/239; 709/425; 709/575; 379/2; 330/3; 714/4
[58] Field of Search .................................. 709/575, 425, 709/237, 238, 239; 379/2; 714/4

[56] References Cited

U.S. PATENT DOCUMENTS

| | | |
|---|---|---|
| 4,076,961 | 2/1978 | Holsinger et al. ................ 340/147 |
| 4,577,182 | 3/1986 | Millsap et al. . |
| 4,718,079 | 1/1988 | Rabito . |
| 4,856,047 | 8/1989 | Saunders . |
| 4,887,290 | 12/1989 | Dop et al. . |
| 4,910,763 | 3/1990 | Caron et al. . |
| 4,995,035 | 2/1991 | Cole et al. . |
| 5,002,387 | 3/1991 | Baljet et al. . |
| 5,005,122 | 4/1991 | Griffin et al. . |
| 5,125,021 | 6/1992 | Lebowitz . |
| 5,128,979 | 7/1992 | Reich et al. . |
| 5,134,644 | 7/1992 | Garton et al. . |
| 5,426,773 | 6/1995 | Chabanet et al. . |
| 5,448,723 | 9/1995 | Rowett . |
| 5,454,024 | 9/1995 | Lebowitz . |

FOREIGN PATENT DOCUMENTS

WO 92/18931  10/1992  WIPO ............................. G06G 11/20

OTHER PUBLICATIONS

G.F. Italiano and R.??maswami, *IBM Technical Disclosure Bulletin*, vol. 37, No. 02B, Feb., 1994.
International Technical Support Center, IBM Communications Server OS/2 WARP Version 4.0 Enhancements, Publication No. SG24–4587, pp. 93–95.

*Primary Examiner*—Zarni Maung
*Assistant Examiner*—Hieu C. Le
*Attorney, Agent, or Firm*—Myers Bigel Sibley & Sajovec; Jeanine S. Ray-Yarletts

[57] ABSTRACT

Methods, systems and computer program products for the reassignment of communications sessions to a primary network communications path from a secondary network communications path are provided, which detect the availability of the primary network communications path and reroute existing transferable communications sessions to the primary network communications path from the secondary network communications path. Non-transferable communications sessions are maintained over the secondary network communications path until such non-transferable communications sessions are terminated. Upon termination of all such non-transferable communications sessions, the secondary network communications path may be deactivated. Additionally, new communications sessions may be assigned to the primary network communications path if the availability of the primary network communications path has been detected. Moreover, the reassignment of communications sessions to a primary network communications path from a secondary network communications path may be performed automatically by the network control software, without disruption of the communications sessions.

21 Claims, 4 Drawing Sheets

NON-DISRUPTIVELY REROUTING NETWORK COMMUNICATIONS FROM A SECONDARY NETWORK PATH TO A PRIMARY PATH

FIELD OF THE INVENTION

The present invention relates to methods and systems for assigning communications sessions between multiple network communications paths.

BACKGROUND OF THE INVENTION

Data communication networks refer to resources which interconnect and provide for communications between various computers, telephones, and other network users that are located at geographically separate locations. These networks can range from small networks interconnecting computers within a building to large distributed networks spanning countries or continents. Data communications networks are typically implemented where a large number of users interact or access common files or databases, as such networks provide the necessary connectivity while sharing communications resources in a cost-effective manner.

Data communications networks are comprised of a group of switches, which are referred to as nodes, network users, who reside at or are electronically connected to the nodes, and a plurality of transmission links which interconnect the nodes. The nodes serve to provide users access to the network, and provide means for routing data transmitted across the network. The transmission links which interconnect these nodes carry the communications signals, and may comprise one or more different types of communications media such as wire, cable, radio, satellite or fiber optic communications links.

In recent years, both the size and number of data communications networks have proliferated. For instance, the recent expansion of the Internet is just one example of the trend toward distributed computing and information sharing. Most of these networks provide for communications between users by transmitting data over one or more network "communication" or "routing" paths, which refer to the sequential series of nodes and transmission links the data traverses in traveling from a source user to the end user. Each transmission link on such a network communications path is typically referred to as a link or "hop," and the communication path often includes multiple links or hops as most networks only provide sparse connectivity (i.e., most nodes are only connected to a small percentage of the nodes in the network). Thus, a communication may be originated by a first user and pass through several links before reaching the recipient user.

The control over these communications is typically carried out under a networking architecture. Many networking architectures exist for defining and managing communications between network users. A prominent example of an existing network communications architecture is the System Network Architecture (SNA) which was initially developed by International Business Machines (IBM) over twenty years ago. SNA comprises a seven layer communications architecture which allows reliable transmission of data between a host computer and other remote computers or users.

As the number of secondary computers or users proliferated, and as many secondary computers became more powerful, many SNA architecture networks became flooded with information and some host computers became overburdened in attempting to manage the links and flow of data to the numerous secondary users. In light of this problem, a need for more advanced architectures developed that would allow multiple computers or users to assume a primary role in network routing, management and control, in order to avoid a single host computer from being overburdened by the task. One of the network architectures which was developed to fill this need is known as Advanced Peer-to-Peer Networking (APPN). APPN allows multiple computers, which are defined as "network nodes," to act as peers in communicating and directing information across a network. In addition to these network nodes, APPN networks also may have "end nodes," which are capable of sending and receiving messages, but which do not perform any of the management and routing functions carried out by the network nodes. Moreover, APPN allows an entire SNA network to present an image as a single APPN network node (with multiple connections), thereby allowing SNA networks (which are now typically known as subarea SNA networks) to exist in an APPN network and to have APPN connectivity.

While APPN has proven to be a reliable networking architecture, increased computer networking requirements have created a demand for network architectures which utilize higher performance computer and communication systems. In part because of these demands, High Performance Routing (HPR), which is an enhancement to APPN, was developed. HPR takes advantage of the advances in processing capability, link technology, lower cost memory, error correction coding and other communications and routing enhancements to provide reliable, high speed data routing and delivery which includes both end-to-end error recovery and end-to-end flow and congestion control, where the flow of data is controlled by the sending and receiving systems. HPR also provides for more efficient routing at intermediate nodes.

As the development of data communications networks and their communications architectures have evolved, a demand for more fault tolerant network designs has emerged as users demand a high availability of communications. To meet this demand, many networks provide redundant parts, data checking and correction and other measures that help avoid failures and minimize communications errors introduced by the network. Additionally, many networks also now provide backup or secondary link definition, which allows for communications over a second link in the event that the primary link fails for some reason. Examples of networks which provide various mechanisms for providing some sort of backup link capability include the networks described in U.S. Pat. Nos. 4,887,290, 5,134,644 and 5,448,723, and U.S. Pat. No. 5,426,773 which describes an SNA network design that includes backup path definition in the event of a failure on a primary communications path.

Additionally, HPR also provides for non-disruptive path switching. When HPR detects a possibly failed connection (i.e., a node or link along the communications path is no longer operating properly), it may perform a switch to a secondary communications path (if one is available) and then resume the transfer of data on the secondary path. Thus, HPR allows for non-disruptive path switching in the case of path failures.

One advantage of flexible network architectures such as HPR is that when error conditions occur the network may be able to reroute data around the failing path to a backup path. Thus, the reliability of the network is maintained. Similarly in a load balanced network which shares communications across multiple concurrent paths, when one of the concurrent paths is disrupted the connections on that path may be rerouted to the other concurrent paths.

One disadvantage of switching to a backup path when a primary path fails is that often backup paths are less economical or of lower performance than a primary path. Thus, for example, a primary path may be over high speed links and the secondary path over lower speed links. When one of the high speed links fails the network connections are rerouted to the backup path, but the throughput of the connection may be reduced considerably. Therefore, performance to the user may be reduced. Similarly, the primary path may utilize low cost leased links, while the backup path often uses high cost switched links. Thus, when a link on the primary path fails and a connection is switched to a backup path, the cost of the connection may be greatly increased. Moreover, in the load balancing context, when connections are transferred from a failed primary path to a secondary or backup path, there is an increase in traffic on the backup path. This increase in traffic may result in a decrease in performance on the shared path.

In light of the above discussion, there exists a need for improvement in the performance of data communications networks after an error condition causes the failure of a network node or link.

SUMMARY OF THE INVENTION

In view of the above discussion, it is an object of the present invention to provide improved performance in data communications networks after a failure at a network node or link.

Another object of the present invention is to provide reduced cost in the event of network failures.

It is still another object of the present invention to maintain load balancing in load balanced networks after failure of a communications path.

In light of these and other objects, the present invention provides for the reassignment of communications sessions to a primary network communications path from a secondary network communications path by detecting the availability of the primary network communications path and rerouting existing transferable communications sessions to the primary network communications path from the secondary network communications path. Non-transferable communications sessions are maintained over the secondary network communications path until such non-transferable communications sessions are terminated. Upon termination of all such non-transferable communications sessions, the secondary network communications path may be deactivated. Additionally, new communications sessions may be assigned to the primary network communications path if the availability of the primary network communications path has been detected. Moreover, the reassignment of communications sessions to a primary network communications path from a secondary network communications path may be performed automatically by the network control software, and without disruption of the communications sessions.

In another embodiment of the present invention, the transferrable communications sessions which may be reassigned to the primary network communications path include both non-disruptively reroutable and non-disruptively terminable communications sessions. In this embodiment, the non-disruptively terminable communications sessions may be terminated on the secondary network communications path after the availability of the primary network communications path is detected, and re-initiated on the primary network communications path.

In yet another aspect of the present invention, the communications network is a System Network Architecture network operating with Advanced Peer-to-Peer networking and High Performance Routing. In this embodiment, High Performance Routing sessions are non-disruptively rerouted to the primary network communications path from the secondary network communications path. Additionally, sessions used exclusively by network control programs to manage network services, such as APPN Control Point to Control Point (CP-CP) and APPN Control Point Server Manager (CPSVRMGR) sessions, may be terminated on the secondary network communications path after the availability of the primary network communications path is detected, and then reinitiated on the primary network communications path.

Thus, the present invention provides methods, systems and computer program products for non-disruptively rerouting communication sessions from a secondary network communications path to a primary network communications path upon reactivation of that primary path. By providing means for non-disruptively rerouting communications sessions back to the primary path when the primary has been restored, the present invention can help minimize the costs to the user and enhance network communications performance, and may also facilitate network load balancing efforts. Additionally, the present invention provides for such non-disruptive rerouting in a manner that is transparent to the network users, and which may be performed automatically without user or operator intervention. Moreover, the present invention may be implemented within the framework of existing network architectures, such as APPN HPR, thereby facilitating use of the present invention in existing networks.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention provides methods, systems and computer program products for assigning communications sessions between primary and secondary communications paths. The present invention may be used in situations where communications sessions are using a secondary network communications path to transmit information to or from a particular node in the network to other nodes in the network. Such secondary or "backup" network communications paths are often either more expensive and/or of lower performance than the primary network communications path, and hence it is often desirable to transfer communications from such a secondary network communications path to the primary network communications path if the primary path is available. Additionally, by transferring all communications session back to the primary network communications path, the secondary network communications path may optionally be deactivated so that the user may avoid paying for both paths when the primary path is carrying all the traffic from a particular node.

Figure 1:
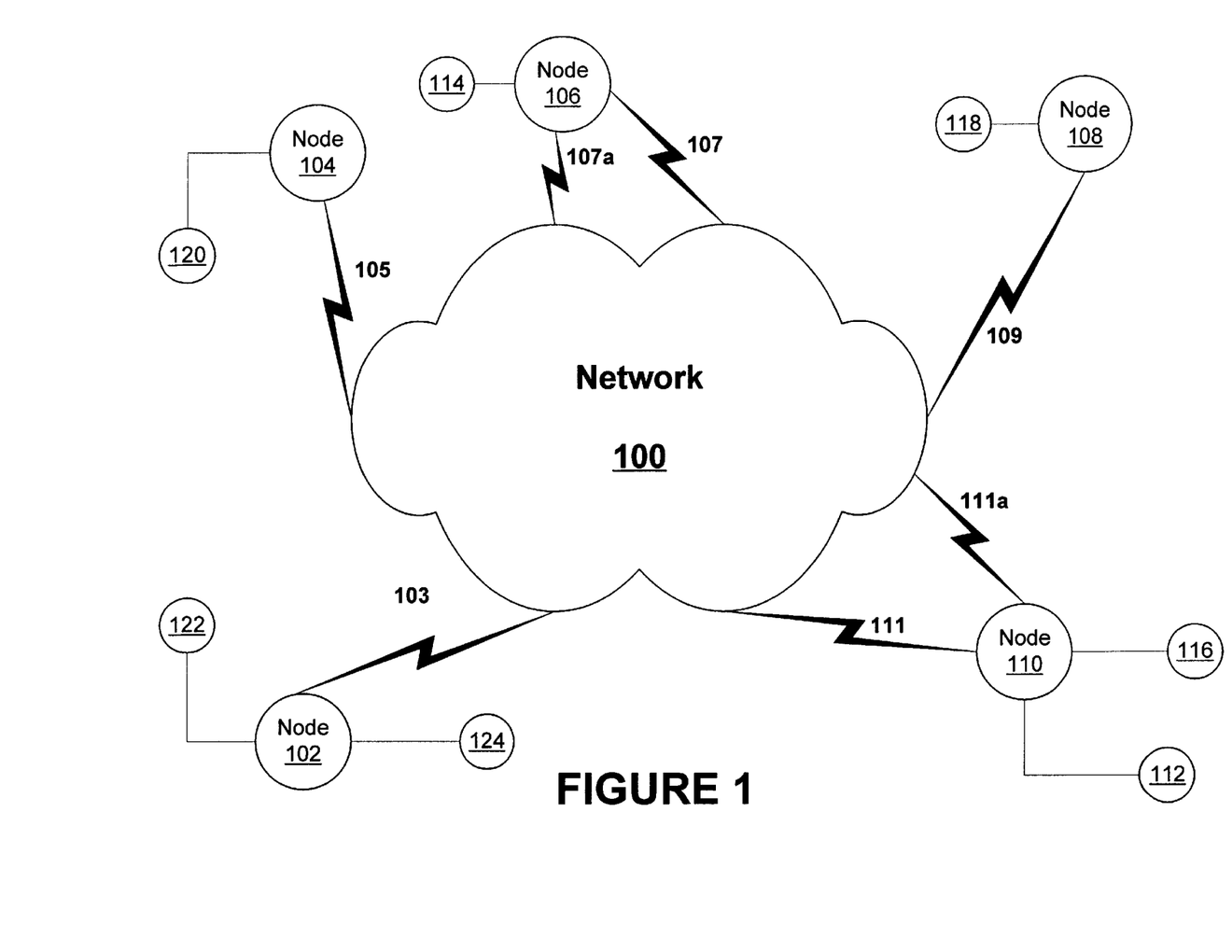
FIG. 1 is a diagram illustrating an exemplary data communications network.

FIG. 1 illustrates a data communications network 100 (and some of its constituent nodes) in which the methods and systems of the present invention may be utilized. As illustrated in FIG. 1, the data communications network 100 interconnects a number of nodes 102, 104, 106, 108, 110 to each other, and also interconnects these nodes with various other nodes which comprise network 100 (which are not shown in FIG. 1). Various end users, which may comprise any of a variety of electronic devices, are typically connected to one or more of the nodes, such as users 112, 114, 116, 118, 120, 122, 124 in FIG. 1. Nodes 102, 104, 106, 108, 110 may comprise one or more various different types of nodes, such as hosts, end nodes, network nodes and the like. As will be understood by those of skill in the art, network 100 may include hundreds or thousands of nodes interconnected by various communications links, and may comprise a single network or a network comprised of numerous sub-network structures, such as wide area networks, local area networks, X.25 telecommunications networks, etc., which are interconnected by gateways and/or other communications links. Network 100 may operate using any of a variety of network communications architectures, such as IBM's System Network Architecture (SNA) or variations thereof.

As illustrated in the example network of FIG. 1, nodes 102, 104, 106, 108, 110 are typically connected to network 100 by communication links 103, 105, 107, 109, 111, which may comprise any appropriate communications media, such as wire, cable, radio, satellite or fiber optic communications links, and which may comprise a single communications channel or multiple communications channels. Herein, references to a "network communications path" refer to both communications path through the network which comprise a single communications link and paths which comprise multiple communications links.

As will be understood by those of skill in the art, when two or more users (e.g., users 114 and 124) communicate via network 100, a communications "session" is typically established between those two users. This "session" comprises a network connection which is established and maintained between the end users that facilitates providing reliable, timely communications between those end users. Once such a connection is established, one or more different communications signals may be exchanged between the users, and the session is typically maintained until shut down by a user, an inactivity timeout, a failure, or a network re-initiation. Moreover, under certain networking architectures, a particular session may be maintained despite a failure in a link on the original network connection, by rerouting the session to another network connection. By way of example, in an a network operating under the SNA architecture, a communications session refers to the connections that are established and maintained by the highest four layers of the SNA architecture.

As is also illustrated in FIG. 1, one or more of nodes 102, 104, 106, 108, 110 may be connected to network 100 via multiple communications links or paths. Thus, for example, in FIG. 1, nodes 110 and 106 are each connected to the network via two communications paths, 111, 111a and 107, 107a, respectively. When a node such as node 106 is connected to the network via multiple communications paths 107, 107a, one of the communications paths 107 may be designated as the primary path for some or all of the communications sessions routed to or from node 106, and the other communications path 107a may be designated as the secondary or "backup" path. When such primary and secondary paths are available, typically communications sessions established to or from node 106 are carried along the primary path 107, and the secondary path 107a is not used. However, if primary path 107 fails for some reason, such as an equipment failure, software error, power failure or the like, then existing communications sessions may be switched over to the secondary path 107a. Accordingly, provision of the secondary path allows a higher availability of communications to be provided, as communications sessions may be maintained over the secondary path 107a while the fault in the primary path link 107 is attended to or repaired. While the primary path 107 is unavailable, all new communications sessions are assigned to the secondary path 107a.

Upon reactivation (i.e., recovery of the link or links on the path from the failure that caused the path to be unavailable) of the primary network communications path 107, it may often be desirable to transfer existing communications sessions and/or assign new communications sessions to the primary path 107. Such transfers and/or reassignments may be desirable because, for example, the primary network communications path is less expensive or of better quality than the secondary path, or to evenly distribute network traffic between all the available network communications paths in order to minimize delay times and maximize network performance. The teachings of the present invention provide for transferring and/or reassigning communications sessions from the secondary network communications path to the primary path are provided. These transfers may operate automatically, without the need for user intervention, and are non-disruptive in the sense that they do not require termination and reactivation of existing communications sessions or the retransmission of data, and in that they typically add little or no additional delay.

The present invention will now be described with respect to FIG. 2 and FIG. 3 which are flowcharts illustrating the operation of hardware or software for non-disruptively rerouting communications sessions between primary and secondary network communications paths utilizing the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 2:
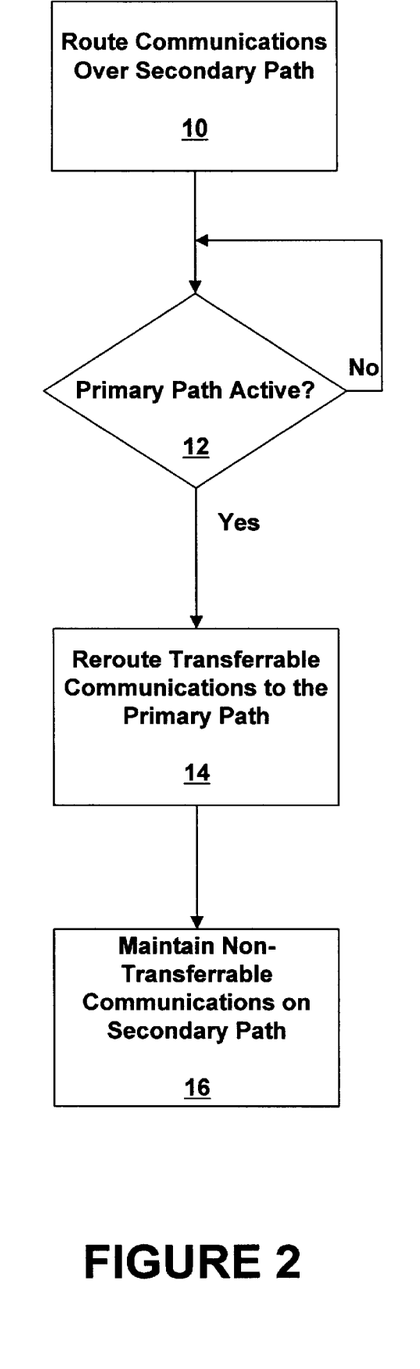
FIG. 2 is a flow chart of one embodiment of the present invention.

The flowchart of FIG. 2 illustrates one embodiment of the present invention that reassigns communications sessions from a secondary network communications path to a primary network communications path. As illustrated in block 10 of FIG. 2, initially communications sessions are routed over a secondary network communications path. Typically, the secondary communications path is used because an earlier failure in the primary path necessitated transferring communications to the secondary path, although the secondary path might also be used for any number of other reasons, such as reduced lease rates, better performance characteristics or the like. As illustrated in block 12 of FIG. 2, the status of the primary network communications path may be periodically monitored, to determine if the primary network communications path has been reactivated so as to be available for transmitting communications sessions. Once the primary communications path has been reestablished, pursuant to the present invention all then existing communications sessions which are "transferrable" communications sessions may be rerouted from the secondary network communications path to the primary network communications path (block 14). However, all "non-transferrable" communications sessions are maintained on the secondary network communications path (block 16).

As will be understood by those of skill in the art, the monitoring, routing and other network management and control functions described above are typically carried out by network control hardware, software or a combination thereof. Such network control resources may be located at any node in the network, or more typically, such network control functions are distributed among many or even all the nodes in the network. Accordingly, the present invention is not limited to any specific location or implementation of the network control resources, but is intended to encompass all network control systems and methods that perform the functions illustrated in the Figures and described in the claims.

Figure 3:
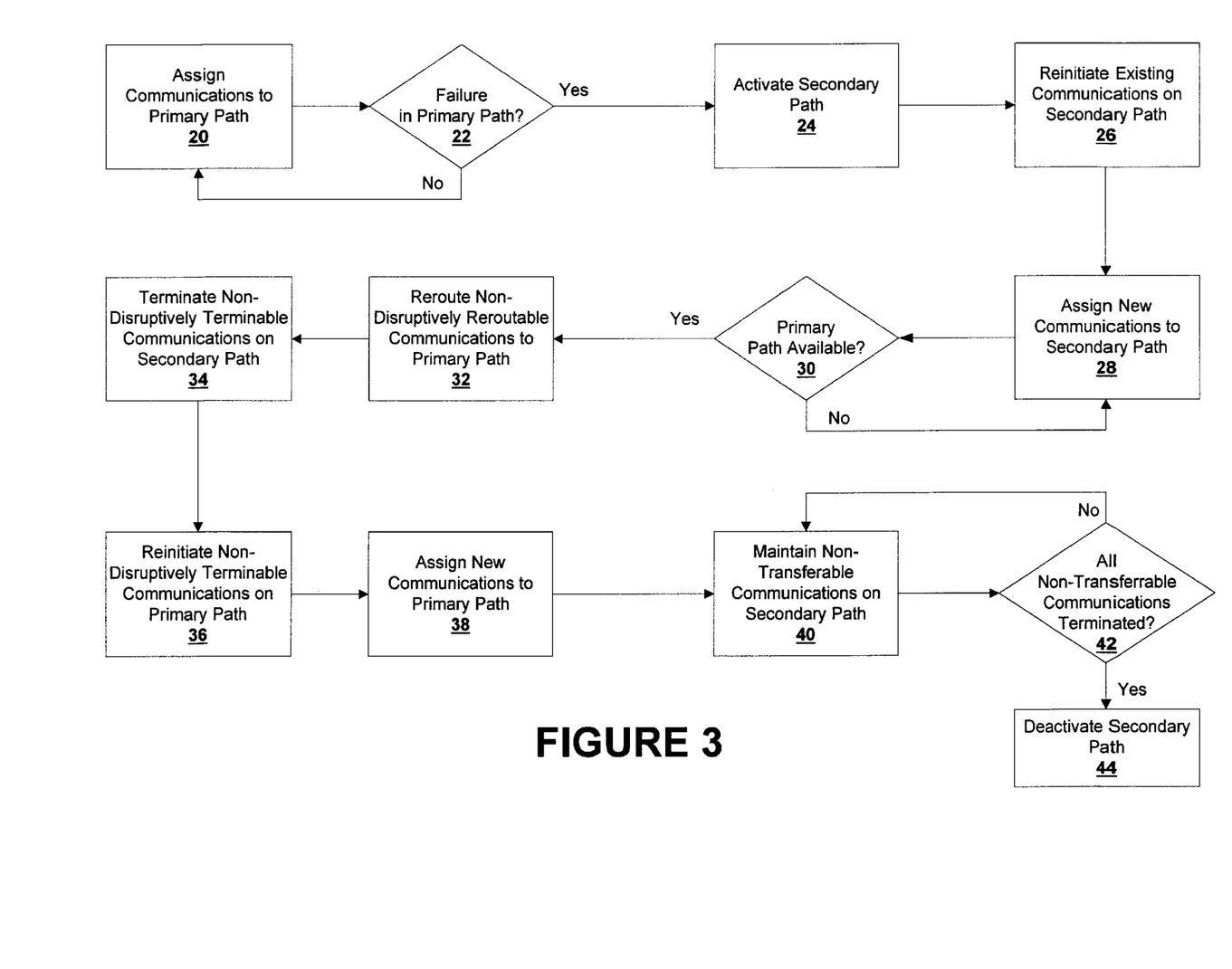
FIG. 3 is a flow chart illustrating another embodiment of the present invention.

FIG. 3 illustrates another embodiment of the present invention. As shown at block 20 of FIG. 3, and as discussed above, typically all communications sessions are assigned to the primary network communications path, as that path typically provides better performance and/or costs less than any secondary network communications path. Upon a failure along the primary communications path (block 22), the network control hardware/software typically will attempt to reactivate the primary communications path one or more times (not shown in FIG. 3). If these reactivation attempts are unsuccessful, the network control hardware/software then may activate the secondary network communications path (block 24).

Once the secondary network communications path is activated, the network control hardware/software reinitiates on the secondary network communications path (block 26) the communications sessions which were ongoing on the primary network communications path at the time of the path failure. Additionally, the network controller assigns any new communications sessions to the secondary network communications path (block 28). As will be recognized by those of skill in the art, such a reassignment may be implemented in any number of ways, including setting the "cost" associated with the secondary communications path to a level lower than the cost associated with the primary network communications path or by removing the primary network communications path as an option in the database of available paths. Once the secondary path is activated, the network controller periodically checks the status of the primary network communications path, to determine if that path has been reactivated (block 30). Unless the primary path has been reactivated, the network control hardware/software continues to assign all new communications sessions to the secondary network communications path.

According to the teachings of the present invention, once the network control hardware/software determines that the primary network communications path has been reactivated and is again available, all existing "transferrable communications sessions" are rerouted to the primary network communications path from the secondary network communications path. Such transferrable communications sessions include any sessions which may be non-disruptively transferred from one path to another, preferably without any user intervention or interaction.

One such type of transferrable communications sessions are referred to herein as non-disruptively reroutable communications sessions. As illustrated in FIG. 3, upon reactivation of the primary network communications path, these non-disruptively reroutable communications sessions may be rerouted to the primary path (block 32). Such non-disruptively reroutable communications session include any communications sessions which may be transferred from one communications path to another without user intervention and without loss of data. With reference to networks operating under SNA with Advanced Peer-to-Peer Networking (APPN), an example of non-disruptively reroutable communications sessions are the High Performance Routing (HPR) communications session which may be used in SNA APPN networks.

A second type of transferrable communications sessions are referred to herein as non-disruptively terminable communication sessions. Such non-disruptively terminable communications sessions refer to communications sessions which may be non-disruptively rerouted to the primary path by terminating the session on the secondary path (block 34) and then re-initiating the session on the primary path (block 36). Once again with reference to SNA and APPN, examples of non-disruptively terminable communications sessions are CP-CP communications sessions and CPSVRMGR sessions. CP-CP sessions refer to Control Program to Control Program sessions which carry network control transactions between control programs in adjacent APPN nodes. CPSVRMGR sessions refer to Control Program Server Manager sessions which carry network control transactions between control programs in APPN nodes that are not adjacent. In SNA APPN, CP-CP and CPSVRMGR sessions are serially reused by network control programs to perform transactions that facilitate various network management, routing and control functions. Between transactions, these sessions are idle and may be non-disruptively terminated and reinitiated on another path.

Those of skill in the art will recognize that rerouting transferable communications sessions from the secondary path to the primary path (blocks 32, 34, and 36) is not a singular event. The primary path may become available after a new session activation has been initiated but before session activation is completed. Likewise, the primary path may become available before all the transferable sessions have been completely rerouted to the secondary path after the original failure of the primary path. According to the teachings of the present invention, the network control hardware/ software recognizes the state where the primary path is available and continues to reroute transferable communications sessions to the primary path whenever a new session activation is completed on the secondary path or an existing session is rerouted to the secondary path.

Once the primary network communications path is reactivated and available, typically all new communications sessions are assigned to the primary path (block 38). As will be understood by those of skill in the art, this can be accomplished in a number of ways, such as, for example, by quiescing the secondary network communications path and/ or by assigning the secondary path a higher cost than the primary path.

In addition to non-disruptively reroutable communications sessions and non-disruptively terminable communications sessions, the secondary network communications path may also carry various non-transferrable communications sessions. Such non-transferrable communications sessions refer to communications sessions which may not be non-disruptively rerouted from one network communications path to another. As shown in FIG. 3, such non-transferrable communications sessions are maintained on the secondary network communications path (block 40) even after the primary network communications path is again made available. However, once all such non-transferrable communications sessions have been terminated (block 42), either by naturally concluding or via termination by a network user or controller, the secondary network communications path may be deactivated (block 44). The determination of whether all transferrable communication sessions has been made back to the primary path may be made by keeping track of the types of communication sessions on the secondary path and then tracking which sessions have been transferred back to the primary path. Sessions may be categorized as described above and a list of the sessions in each category may be maintained.

While FIGS. 2 and 3 illustrate one particular order in which the functions described therein may be carried out, those of skill in the art will understand in light of the teachings of the present invention that other orders for carrying out the functions may be employed to achieve the results described herein. For example, in FIG. 3, blocks 34 and 36 indicate that the non-disruptively terminable communications are terminated on the secondary path and reinitiated on the primary path while the secondary path is still active and carrying other non-transferrable communication sessions. However, the present invention may also be implemented by retaining all non-disruptively terminable communications on the secondary path until all other communication sessions on that path are terminated, and then deactivating the secondary path and reinitiating the non-disruptively terminable communications on the primary path.

As will also be understood by those of skill in the art, the "activation" of a network communications path referred to above and shown in FIG. 3 does not necessarily entail physically initializing the communication link or links which comprise the path, but instead may merely refer to the performance of the control functions that are necessary to make the network communications path available for the assignment of certain communications sessions. Accordingly, the "activation" of a secondary network communications path as shown at block 24 may simply entail updating routing tables at a particular node to indicate that the secondary path, which already is active and carrying other network communications traffic, is now available for the establishment of communications sessions to and from that particular node. Similarly, the "deactivation" of a network communications path as shown at block 44 may simply refer to the performance of the control functions that are necessary, such as updating routing tables, to remove the network communications path so that it is no longer available for the assignment of certain communications sessions. Thus, the activation and deactivation steps illustrated in FIG. 3 may not involve any physical changes on the communications links which comprise the network communications path which is being "activated" or "deactivated." However, in practical terms such activation and deactivation steps may be quite important, as a user is often charged on the basis of the number of active paths or links which are being maintained to support his communications.

Additionally, while block 24 of FIG. 3 indicates that the secondary network communications path is activated, those of skill in the art will understand that activation of the secondary path is not required if the secondary path is already active. For instance, in situations where the secondary path already is carrying other network communications for the user, or where no additional lease charges apply, there may be no reason to deactivate the secondary path when it is not in use, and hence it will typically remain active, even if not in use, at all times. However, in a preferred embodiment of the present invention, the secondary path is deactivated when the primary path is active and all communications sessions are being carried on the primary path, as this serves to minimize lease costs for use of the secondary path. Then, in the event of a failure on the primary network communications path, the secondary is activated, typically automatically, although the network controller may attempt to reactivate or "recover" the primary path one or more times prior to activation of the secondary path. Note though that if the primary path is inactivated by a user or by an inactivity timeout, the secondary path typically is not activated in this embodiment.

It will further be understood that according to the teachings of the present invention, the rerouting of communications sessions illustrated in FIGS. 2 and 3 back to a primary network communications path from a secondary network communications path after the primary path is reactivated may be performed automatically by the network control hardware/software, without any need for user intervention or interaction and without any disruption of network communications. Such rerouting is performed automatically by carrying out, for example, the functions illustrated in the flow chart of FIG. 3, whereby the network monitors both the status of the paths and the communications sessions, and upon determining the re-availability of the primary path, transfers non-disruptively reroutable and non-disruptively terminable communications sessions to the primary network communications path, and deactivates the secondary network communications path once all communications sessions thereon have been transferred or completed.

In a preferred embodiment of the present invention, the methods and/or systems described herein are implemented in SNA APPN networks. While various prior art networks may provide for both primary and secondary communications paths, these networks do not provide mechanisms for transferring communications sessions back to the primary path, if and when it is reestablished. This is particularly true with SNA APPN networks, as certain types of communications sessions such as CP-CP sessions and CPSVRMGR sessions remain active indefinitely once established, and hence once a switch over to the secondary communications path is implemented, sessions will exist on the secondary path until active measures are taken to somehow transfer such sessions to another path. Accordingly, a transfer of sessions back to the primary communications path may only be implemented via user interaction, and with the disruption of existing communications.

In one SNA APPN embodiment of the present invention, these disadvantages of the prior art may be overcome by coding the secondary network communications path as a limited resource path with a higher cost per connect. Such coding causes new communications sessions to be assigned to the primary path (as long as it remains available), as the SNA APPN Topology and Route Selection (TRS) assigns the primary path a low cost if it is available but removes it if it is not available. In this embodiment, non-disruptively reroutable communications sessions such as HPR communications sessions are rerouted to the primary network communications path as soon as it is detected as being available by "quiescing" the secondary path. Such "quiescing" may be accomplished by sending a "quiesce" message that identifies the secondary path to the HPR control hardware/software. The HPR control hardware/software initiates a path switch of the existing non-disruptively reroutable HPR communications sessions from the secondary path to the primary path. In addition, the HPR control hardware/software associates the quiesced state with the secondary path and automatically initiates a path switch when, subsequently, a new session is activated on the secondary path or another session is rerouted to the secondary path.

In APPN, a quiesce may be accomplished through sending a non-activation XID message to the adjacent node in the HPR path. Additionally, a second "quiesce" message also may be sent to the network control hardware/software (typically to the Topology and Route Selection hardware/software), which instructs the control resources to prevent any new sessions from using the secondary path by assigning all such sessions to the primary path. Moreover, by coding the secondary path as limited resource path, communications sessions on the secondary path are automatically terminated after the conversation ends. Once the only communications sessions that remain on the secondary path comprise CP-CP and/or CPSVRMGR sessions, these sessions are terminated and re-initiated on the primary path, and the secondary network communications path may be deactivated, if desired.

In SNA APPN networks, there are at least two different types of links. The first of these links types, SNA Subarea Links, also known as Host Links, which carry traffic on sessions that can only be established with the facilities of a System Services Control Point (SSCP) and which may optionally carry APPN traffic. The second type are APPN Only-Links, which exclusively carry APPN traffic. In a preferred embodiment of the present invention, the methods and systems described herein are used to reroute communications sessions from a secondary network communications path to a primary network communications path on APPN Only Links. Note that in this embodiment of the present invention the activation of sessions between logical units that depend on SSCP facilities may be accomplished by encapsulating the SSCP protocols on an APPN CPS-VRMGR session.

In another embodiment of the present invention, the network control hardware/software continues to monitor the primary path after it is reactivated. If the primary path then fails again while the secondary path is still active, new sessions are again allowed to use the secondary path. In an SNA APPN network which operate with HPR traffic, this may be accomplished by sending an unquiesce signal to Topology and Route Selection, by sending an unquiesce signal to HPR to initiate a path switch of HPR sessions from the primary to the secondary path (in the case where the HPR signals had already been transferred back to the primary path), and by sending topology data updates and non-activation XID's to each remote node that notify the nodes that the secondary path is quiesced and should not be used for new sessions.

Figure 4:
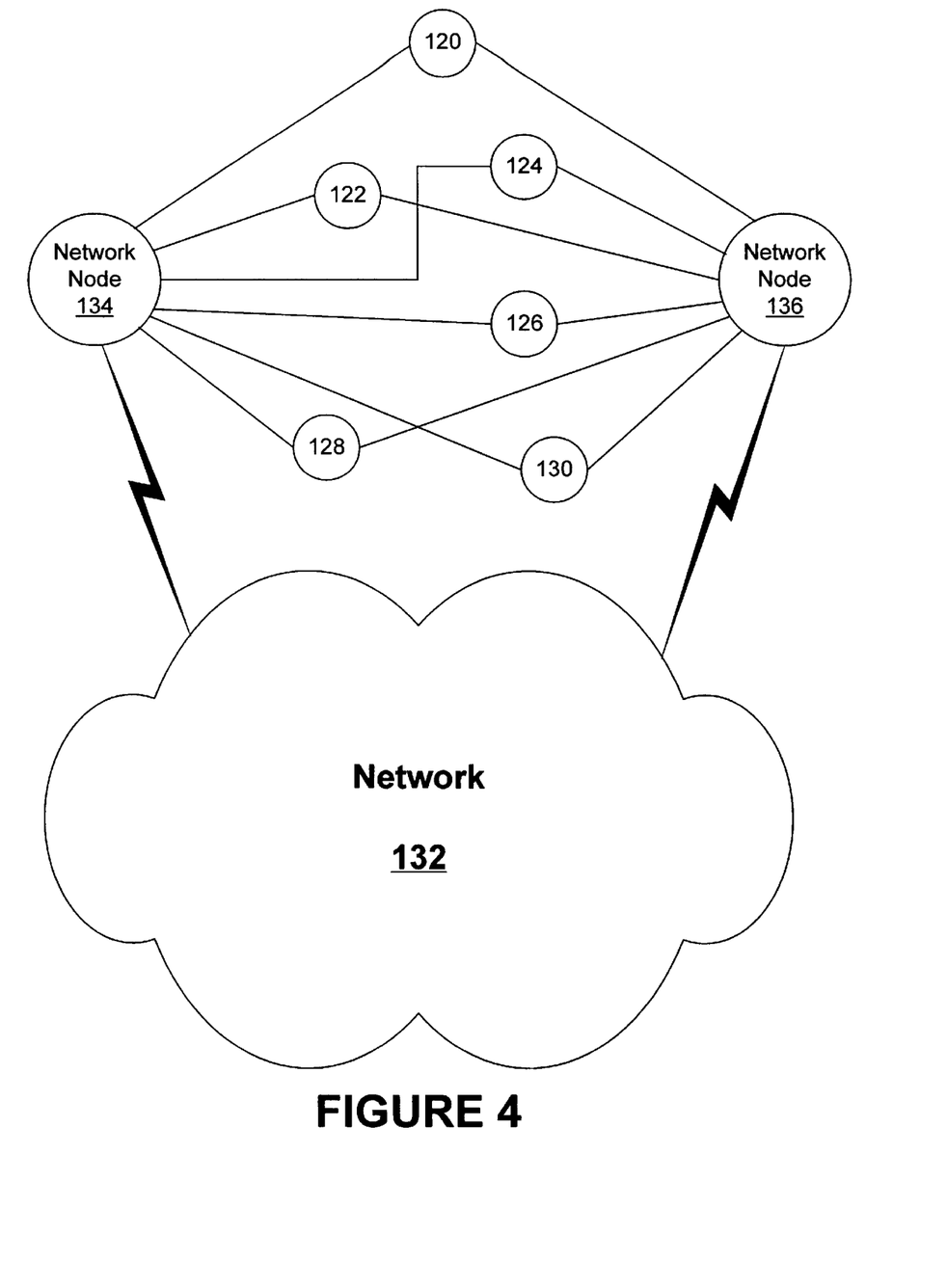
FIG. 4 is a diagram illustrating how the present invention facilitates load balancing.

In another aspect of the present invention, load sharing between network nodes may be facilitated while at the same time removing the network node as the single point of failure as viewed from the end node. As illustrated in FIG. 4, load sharing may be employed when a number of workstations or other end nodes 120, 122, 124, 126, 128, 130 are connected to a network 132 via two or more network nodes 134, 136. Load sharing or "load balancing" may be accomplished in this situation by specifying the network communications path from several of the end nodes, such as nodes 120, 126, 128, to network node 134 as the primary path for those end nodes 120, 126, 128, and the network communications path from end nodes 120, 126, 128 to network node 136 as the secondary path. Similarly, the path from the remaining end nodes 122, 124 to network node 136 is specified as the primary path for end nodes 122, 124, with the paths from end nodes 122, 124 to network node 134 specified as the secondary path. By assigning the paths as described above, it is possible to split the network data traffic between network nodes 134, 136, thereby advantageously balancing the traffic between two nodes for purposes of minimizing delay and improving network performance.

In the event of a failure at either network node 134 or network node 136 (or in the communications links connecting those network nodes to the end nodes), the end nodes using the failed network node as a primary path activate their secondary paths and resume their communications sessions through the remaining active network node (although prior to activating the secondary paths, one or more efforts to reactivate or "recover" the primary path may be attempted). Thereafter, reactivation of the primary path is periodically attempted, until the failed network node (or links thereto) are recovered. Without the primary network communications path recovery mechanisms of the present invention, however, even after recovery of the primary path, most or all of the existing and new communications sessions would continue to use the secondary path to the network node which did not fail, as no mechanism was available for non-disruptively rerouting sessions to once again achieve load balancing by routing sessions over both the primary and secondary paths.

Pursuant to the present invention, however, such load balancing may be non-disruptively achieved, as the secondary path is defined as a limited resource path, with a high associated cost. Due to this definition, upon reactivation of the primary path, new sessions are automatically assigned to the primary path (since it has a lower associated cost), and sessions which may be non-disruptively rerouted or non-disruptively terminated may be transferred back to the primary path to achieve load balancing.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of reassigning communications sessions to a primary network communications path from a secondary network communications path, the method comprising the steps of:

detecting the availability of the primary network communications path;

non-disruptively rerouting existing transferable communications sessions to the primary network communications path from the secondary network communications path; and maintaining non-transferable communications sessions over the secondary network communications path until the non-transferable communications sessions are terminated;

wherein the step of rerouting existing transferable communications sessions comprises the steps of:

rerouting existing non-disruptively reroutable communications sessions to the primary network communications path; and rerouting existing non-disruptively terminable communications sessions to the primary network communications path; and wherein the step of rerouting non-disruptively terminable communications sessions comprises the steps of:

terminating existing non-disruptively terminable communications sessions on the secondary network communications path after detecting the availability of the primary network communications path; and re-initiating the non-disruptively terminable communications sessions on the primary network communications path; and wherein the communications network is a System Network Architecture network operating with Advanced Peer-to-Peer networking and High Performance Routing, and wherein said rerouting non-disruptively reroutable communications sessions step comprises rerouting High Performance Routing sessions to the primary network communications path from the secondary network communications path; and wherein said terminating step comprises terminating existing CP-CP communications sessions on the secondary network communications path after detecting the availability of the primary network communications path; and wherein said re-initiating step comprises re-initiating the CP-CP communications sessions on the primary network communications path.

2. The method of claim 1, wherein said terminating step comprises terminating existing non-disruptively terminable communications sessions on the secondary network communications path by deactivating the secondary network communications path once all the non-transferrable communications sessions are terminated.

3. The method of claim 1, wherein said terminating step further comprises terminating existing CPSVRMGR communications sessions on the secondary network communications path after detecting the availability of the primary network communications path; and wherein said re-initiating step further comprises re-initiating the CPSVRMGR communications sessions on the primary network communications path.

4. The method of claim 1, further comprising the step of assigning new communications sessions to the primary network communications path if said detecting step detects the availability of the primary network communications path.

5. The method of claim 4, wherein said detecting, rerouting, maintaining and assigning steps are performed automatically, and wherein all communications sessions are rerouted to the primary network communications path without disruption of the communications sessions.

6. The method of claim 4, wherein the communications network is a System Network Architecture network operating with Advanced Peer-to-Peer networking and High Performance Routing and wherein said rerouting step comprises:

sending a quiesce secondary link signal to the High Performance Routing controller that reroutes existing High Performance Routing sessions to the primary network communications path from the secondary network communications path; and rerouting existing CP-CP and CPSVRMGR communications sessions to the primary network communications path from the secondary network communications path; and wherein said assigning step comprises assigning new communications sessions to the primary network communications path if said detecting step detects the availability of the primary network communications path by sending a quiesce secondary link signal to Topology and Route Selection.

7. The method of claim 6, wherein the primary network communications path carries only APPN traffic.

8. The method of claim 6, further comprising the step of deactivating the secondary network communications path once all the non-transferable communications sessions are terminated.

9. A method of assigning communications sessions between primary and secondary network communications paths, the method comprising the steps of:

identifying a failure in the primary network communications path;

activating the secondary network communications path;

detecting the availability of the primary network communications path; then assigning new communications sessions to the primary network communications path;

non-disruptively rerouting existing transferable communications sessions to the primary network communications path from the secondary network communications path; and maintaining non-transferable communications sessions over the secondary network communications path until the non-transferable communications sessions are terminated;

wherein the step of rerouting existing transferable communications sessions comprises the steps of:

rerouting non-disruptively reroutable communications sessions to the primary network communications path;

terminating existing non-disruptively terminable communications sessions on the secondary network communications path after detecting the availability of the primary network communications path; and reinitiating the non-disruptively terminable communications sessions on the primary network communications path; and wherein the communication sessions operate using the Advanced Peer-to-Peer networking protocol and wherein said rerouting non-disruptively reroutable communications sessions step comprises rerouting high performance routing sessions to the primary network communications path from the secondary network communications path;

wherein said terminating step comprises terminating existing CP-CP and CPSVRMGR communications sessions on the secondary network communications path after detecting the availability of the primary network communications path; and wherein said reinitiating step comprises reinitiating the existing CP-CP and CPSVRMGR communications sessions on the primary network communications path.

10. The method of claim 9, wherein said identifying, activating, detecting, assigning, rerouting and maintaining steps are performed automatically, and wherein all communications sessions are terminated or rerouted to the primary network communications path without any disruption of the communications sessions.

11. The method of claim 10, further comprising the step of deactivating the secondary communications path once all the non-transferable communications sessions are terminated.

12. A system for reassigning communications sessions to a primary network communications path from a secondary network communications path, the system comprising:

means for detecting the availability of the primary network communications path;

means for non-disruptively rerouting existing transferable communications sessions to the primary network communications path from the secondary network communications path; and means for maintaining non-transferable communications sessions over the secondary network communications path until the non-transferable communications sessions are terminated;

wherein said means for rerouting existing transferable communications sessions comprises:

means for rerouting existing non-disruptively reroutable communications sessions to the primary network communications path; and means for rerouting existing non-disruptively terminable communications sessions to the primary network communications path;

wherein said means for rerouting non-disruptively terminable communications sessions comprises:

means for terminating existing non-disruptively terminable communications sessions on the secondary network communications path after detecting the availability of the primary network communications path; and means for re-initiating the non-disruptively terminable communications sessions on the primary network communications path;

wherein the communications network is a System Network Architecture network operating with Advanced Peer-to-Peer networking and High Performance Routing, and wherein said means for rerouting non-disruptively reroutable communications sessions comprises means for rerouting High Performance Routing sessions to the primary network communications path from the secondary network communications path; and wherein said means for terminating comprises means for terminating existing CP-CP communications sessions on the secondary network communications path after detecting the availability of the primary network communications path; and wherein said means for re-initiating comprises means for re-initiating the CP-CP communications sessions on the primary network communications path.

13. The system of claim 12, wherein said means for terminating further comprises means for terminating existing CPSVRMGR communications sessions on the secondary network communications path after detecting the availability of the primary network communications path; and wherein said means for re-initiating further comprises means for re-initiating the CPSVRMGR communications sessions on the primary network communications path.

14. The system of claim 12, further comprising means for assigning new communications sessions to the primary network communications path if said means for detecting detects the availability of the primary network communications path.

15. The system of claim 14, wherein the communications network is a System Network Architecture network operating with Advanced Peer-to-Peer networking and High Performance Routing and wherein said means for rerouting comprises:

means for sending a quiesce secondary link signal to the High Performance Routing controller that reroutes existing High Performance Routing sessions to the primary network communications path from the secondary network communications path; and means for rerouting existing CP-CP and CPSVRMGR communications sessions to the primary network communications path from the secondary network communications path; and wherein said means for assigning comprises means for assigning new communications sessions to the primary network communications path if said means for detecting detects the availability of the primary network communications path by sending a quiesce secondary link signal to Topology and Route Selection.

16. The system of claim 12, further comprising means for deactivating the secondary network communications path once all the non-transferable communications sessions are terminated.

17. A computer program product for reassigning communications sessions to a primary network communications path from a secondary network communications path, the computer program product comprising:

a computer-readable storage medium having computer-readable program code means embodied in said medium, said computer-readable program code means comprising:

computer-readable code means for detecting the availability of the primary network communications path;

computer-readable code means for non-disruptively rerouting existing transferable communications sessions to the primary network communications path from the secondary network communications path; and computer-readable code means for maintaining non-transferable communications sessions over the secondary network communications path until the non-transferable communications sessions are terminated;

wherein said computer-readable code means for rerouting existing transferable communications sessions comprises:

computer-readable code means for rerouting existing non-disruptively reroutable communications sessions to the primary network communications path; and computer-readable code means for rerouting existing non-disruptively terminable communications sessions to the primary network communications path;

wherein said computer-readable code means for rerouting non-disruptively terminable communications sessions comprises:
- computer-readable code means for terminating existing non-disruptively terminable communications sessions on the secondary network communications path after detecting the availability of the primary network communications path; and
- computer-readable code means for re-initiating the non-disruptively terminable communications sessions on the primary network communications path;
- wherein the communications network is a System Network Architecture network operating with Advanced Peer-to-Peer networking and High Performance Routing, and wherein said computer-readable code means for rerouting non-disruptively reroutable communications sessions comprises computer-readable code means for rerouting High Performance Routing sessions to the primary network communications path from the secondary network communications path; and
- wherein said computer-readable code means for terminating comprises computer-readable code means for terminating existing CP-CP communications sessions on the secondary network communications path after detecting the availability of the primary network communications path; and
- wherein said computer-readable code means for re-initiating comprises computer-readable code means for re-initiating the CP-CP communications sessions on the primary network communications path.

18. The computer program product of claim 17, wherein said computer-readable code means for terminating further comprises computer-readable code means for terminating existing CPSVRMGR communications sessions on the secondary network communications path after detecting the availability of the primary network communications path; and
wherein said computer-readable code means for re-initiating further comprises computer-readable code means for re-initiating the CPSVRMGR communications sessions on the primary network communications path.

19. The computer program product of claim 17, further comprising computer-readable code means for assigning new communications sessions to the primary network communications path if said computer-readable code means for detecting detects the availability of the primary network communications path.

20. The computer program product of claim 19, wherein the communications network is a System Network Architecture network operating with Advanced Peer-to-Peer networking and High Performance Routing and wherein said computer-readable code means for rerouting comprises:
- computer-readable code means for sending a quiesce secondary link signal to the High Performance Routing controller that reroutes existing High Performance Routing sessions to the primary network communications path from the secondary network communications path; and
- computer-readable code means for rerouting existing CP-CP and CPSVRMGR communications sessions to the primary network communications path from the secondary network communications path; and
- wherein said computer-readable code means for assigning comprises computer-readable code means for assigning new communications sessions to the primary network communications path if said computer-readable code means for detecting detects the availability of the primary network communications path by sending a quiesce secondary link signal to Topology and Route Selection.

21. The computer program product of claim 17, further comprising computer-readable code means for deactivating the secondary network communications path once all the non-transferable communications sessions are terminated.

* * * * *